(12) United States Patent
Yuda et al.

(10) Patent No.: US 7,610,259 B2
(45) Date of Patent: Oct. 27, 2009

(54) MANAGEMENT APPARATUS, PROGRAM AND METHOD FOR CONTROLLING DATA INCLUDED IN BILL OF MATERIAL

(75) Inventors: Shinya Yuda, Tokyo (JP); Yuuji Kanbayashi, Tokyo (JP); Shunsuke Minami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 535 days.

(21) Appl. No.: 11/017,038

(22) Filed: Dec. 20, 2004

(65) Prior Publication Data

US 2005/0154704 A1 Jul. 14, 2005

(30) Foreign Application Priority Data

Dec. 24, 2003 (JP) ............................. 2003-427456

(51) Int. Cl.
*G06F 17/30* (2006.01)
(52) U.S. Cl. ...................... 707/1; 707/2; 707/4; 707/6; 707/104.1
(58) Field of Classification Search ................ 707/1–6, 707/104.1
See application file for complete search history.

(56) References Cited

U.S. PATENT DOCUMENTS

| | | | | |
|---|---|---|---|---|
| 5,821,937 A * | 10/1998 | Tonelli et al. | ............... | 715/853 |
| 6,202,070 B1 * | 3/2001 | Nguyen et al. | ........... | 707/104.1 |
| 6,480,857 B1 * | 11/2002 | Chandler | .................... | 707/100 |
| 6,609,129 B1 * | 8/2003 | Luh | ........................... | 707/101 |
| 6,742,003 B2 * | 5/2004 | Heckerman et al. | ...... | 707/104.1 |
| 6,819,967 B2 * | 11/2004 | Ballas et al. | ................ | 700/107 |
| 7,340,481 B1 * | 3/2008 | Baer et al. | ............... | 707/104.1 |
| 2002/0032611 A1 * | 3/2002 | Khan | .......................... | 705/26 |
| 2002/0087440 A1 * | 7/2002 | Blair et al. | .................... | 705/29 |
| 2002/0143774 A1 * | 10/2002 | Vandersluis | .................. | 707/10 |
| 2002/0165805 A1 * | 11/2002 | Varga et al. | ................... | 705/28 |
| 2003/0221172 A1 * | 11/2003 | Brathwaite et al. | ............. | 716/1 |
| 2005/0071259 A1 * | 3/2005 | Arai et al. | ..................... | 705/28 |
| 2006/0116937 A1 * | 6/2006 | Seaman et al. | ................ | 705/29 |
| 2008/0154749 A1 * | 6/2008 | D'hooghe et al. | ............. | 705/28 |

FOREIGN PATENT DOCUMENTS

| JP | 06-036043 | 2/1994 |
|---|---|---|
| JP | 2000-339381 | 12/2000 |
| JP | 2001-265838 | 9/2001 |

(Continued)

OTHER PUBLICATIONS

Amy Sonczalla, "Oracle Bills of Material User's Guide", May 2001, pp. 1-17.*

*Primary Examiner*—Don Wong
*Assistant Examiner*—Hanh B Thai
(74) *Attorney, Agent, or Firm*—Hogan & Hartson LLP

(57) ABSTRACT

A BOM is merged to a BOM stored in a BOM data base by means of the component identification judgment means that compares the product record in the BOM file with the product listed in the BOM stored in the BOM data base and makes judgment conformity between these two product records and a BOM rearrangement means that has a BOM rearrangement means a coding rule estimating means determining the coding compliance. A component assembly flag and a component assembly status flag are appended to the BOM stored in the BOM data base so that the expansion to the lower hierarchal layers of the component is presented.

11 Claims, 12 Drawing Sheets

FOREIGN PATENT DOCUMENTS

| | | |
|---|---|---|
| JP | 2001-331535 | 11/2001 |
| JP | 2002-215775 | 8/2002 |
| JP | 2002-341921 | 11/2002 |
| JP | 2003-114899 | 4/2003 |
| JP | 2003-330522 | 11/2003 |
| JP | 2004-094921 | 3/2004 |

* cited by examiner

FIG. 2

| Part Number | Component Name | Supplier | Supplier Part Number | Price | Component Assembly Flag | Component Assembly Status |
|---|---|---|---|---|---|---|
| A1 | Power Box | – | – | 650 | True | Expanded |
| A11 | Chassis | – | – | 50 | False | – |
| A12 | Drive Unit | – | – | 600 | True | Expanded |
| A121 | Power Unit | D Parts | P-ABC-1 | 200 | True | Expansion Impossible |
| A122 | Motor | B Industries | M-201 | 300 | True | Under Search |
| A123 | Shaft | C Precision Co. | C1-XYZ | 100 | False | – |

205 Part Number, 206 Component Name, 207 Supplier, 208 Supplier Part Number, 209 Price, 210 Component Assembly Flag, 211 Component Assembly Status 201 PN File
202 Component record

| Mother Part | Daughter Part | Quantity |
|---|---|---|
| A1 | A11 | 1 |
| A1 | A12 | 1 |
| A12 | A121 | 1 |
| A12 | A122 | 1 |
| A12 | A123 | 1 |

212 Mother Part, 213 Daughter Part, 214 Quantity
203 PS File
204

215:
A1 — A11
A1 — A12 — A121
A12 — A122
A12 — A123

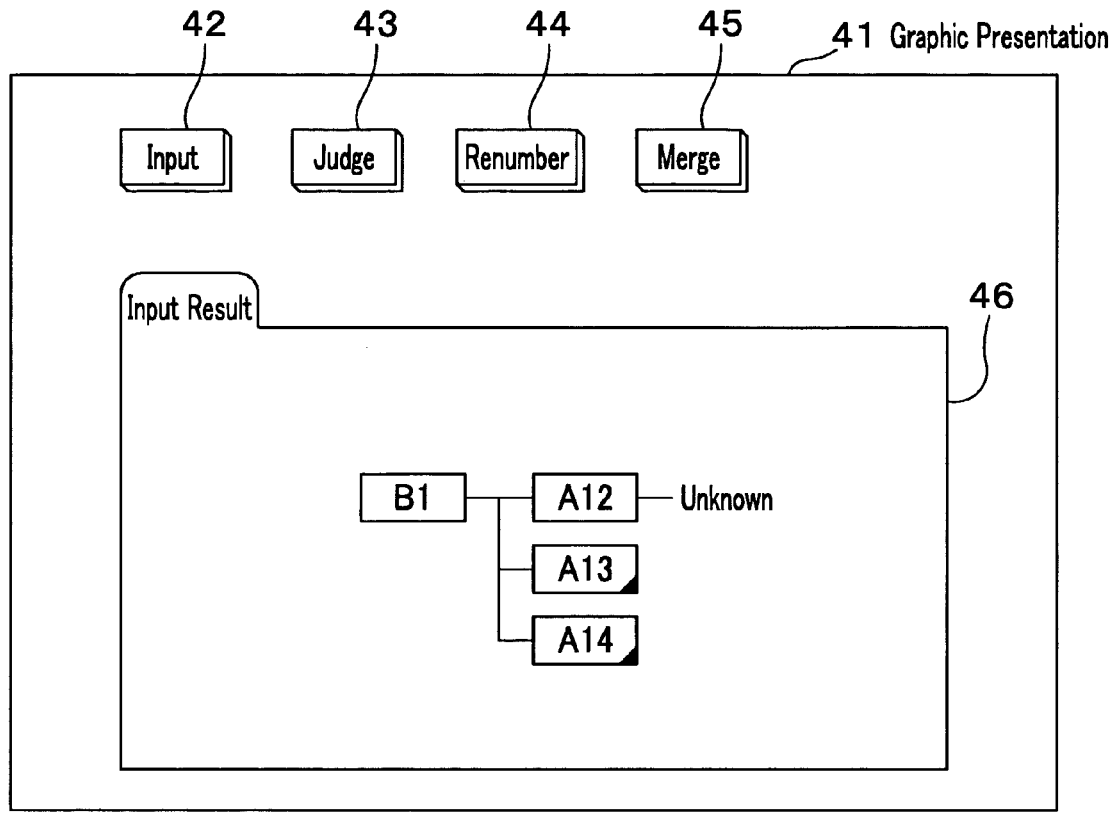

FIG. 9

| Part Number | Component Name | Weight (Kg) | Supplier | Supplier Part Number | Component Assembly Flag | Component Assembly Status | Identification Flag | Same PN | Coding Rule Flag | Obsolete Part Number |
|---|---|---|---|---|---|---|---|---|---|---|
| B1 | Motor | 15 | — | — | True | Expanded | True | A122 | — | — |
| A12 | Stator | 6 | — | — | True | Unknown | — | — | True | — |
| A13 | Rotor | 5 | — | — | False | — | — | — | — | — |
| A14 | Main Shaft | 4 | C Precision Co. | C1-XYZ | False | — | True | A123 | — | — |

502 PN Chart

| Mother Component | Daughter Component | Quantity |
|---|---|---|
| B1 | A12 | 1 |
| B1 | A13 | 1 |
| B1 | A14 | 1 |

503 PS Chart

| Vendor | Part Number | Product Name | Correspondent Part Number |
|---|---|---|---|
| B Industries | M-201 | M-type Motor | B1 |

501 Product Chart

FIG. 10

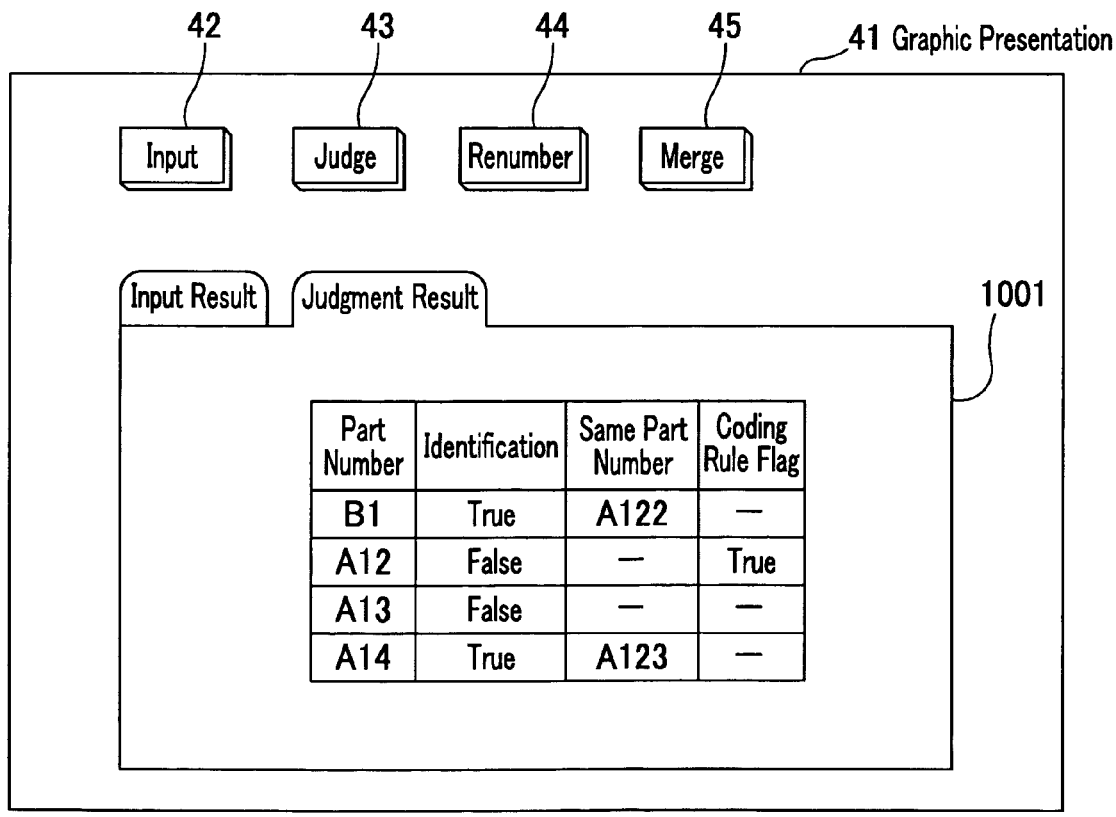

FIG. 12

505 — PN Chart (502)

| Part Number | Component Name | Weight (Kg) | Supplier | Supplier Part Number | Component Assembly Flag | Component Assembly Status | Identification Flag | Same PN | Coding Rule Flag | Obsolete Part Number |
|---|---|---|---|---|---|---|---|---|---|---|
| A122 | Motor | 15 | — | — | True | Expanded | True | A122 | — | B1 |
| B-A12 | Stator | 6 | — | — | True | Unknown | — | — | True | A12 |
| A13 | Rotor | 5 | — | — | False | — | — | — | — | — |
| A123 | Main Shaft | 4 | C Precision Co. | C1-XYZ | False | — | True | A123 | — | A14 |

Columns: 510, 511, 512, 513, 514, 515

503 PS Chart

| Mother Component | Daughter Component | Quantity |
|---|---|---|
| A122 | B-A12 | 1 |
| A122 | A13 | 1 |
| A122 | A123 | 1 |

501 Product Chart

| Vendor | Part Number | Product Name | Correspondent Part Number |
|---|---|---|---|
| B Industries | M-201 | M-type Motor | B1 |

FIG. 13

41 Graphic Presentation

42 Input | 43 Judge | 44 Renumber | 45 Merge

Tabs: Input Result | Judgment Result | Renumbering Result

1301

| Part Number | Coding Rule Flag | Obsolete Part Number |
|---|---|---|
| A122 | — | B1 |
| B-A12 | True | A12 |
| A13 | — | — |
| A123 | — | A14 |

FIG. 14

1401 PN File

| Part Number | Component Name | Supplier | Supplier Part Number | Price | Component Assembly Flag | Component Assembly Status |
|---|---|---|---|---|---|---|
| A1 | Power Box | – | – | 650 | True | Expanded |
| A11 | Chassis | – | – | 50 | False | – |
| A12 | Drive Unit | – | – | 600 | True | Expanded |
| A121 | Power Unit | D Parts | P-ABC-1 | 200 | True | Expansion Impossible |
| A122 | Motor | B Industries | M-201 | 300 | True | Expanded |
| A123 | Shaft | C Precision Co. | C1-XYZ | 100 | False | – |
| B-A12 | Stator | – | – | – | True | Unknown |
| A13 | Rotor | – | – | – | False | – |

| Mother Component | Daughter Component | Quantity |
|---|---|---|
| A1 | A11 | 1 |
| A1 | A12 | 1 |
| A12 | A121 | 1 |
| A12 | A122 | 1 |
| A12 | A123 | 1 |
| A122 | B-A12 | 1 |
| A122 | A13 | 1 |
| A122 | A123 | 1 |

1402 PS File

14 BOM stored in BOM data base

MANAGEMENT APPARATUS, PROGRAM AND METHOD FOR CONTROLLING DATA INCLUDED IN BILL OF MATERIAL

FIELD OF THE INVENTION

The present invention relates to a management apparatus, a management method and a management program for controlling the data included in a bill of material (we call BOM data, hereinafter), especially a BOM management apparatus, a BOM management method and a BOM management program that may consolidate plural BOMs which are compiled by different controlling systems applied to such plural BOMs (we call them plural BOMs which are compiled by different BOM controlling schemes, for the purpose of simplicity). The controlling function for the BOM management also includes the compilation function to generate BOMs in the present invention.

A BOM is a list of parts used for a particular product and complied in an architectural formation to be compliant to the binding or complexity of the product members. For example, a BOM for an electric lamp is first complied with an electric power unit, a suspending column and a bulb and then the structural members such as a bulb socket, a switch, a power cable, a power plug are compiled in the lower hierarchal layers against the power unit which is an upper member. The component which has further composing components which are regarded as the lower hierarchal layers of the BOM, however, is called a component assembly.

When a component assembly is purchased from an outside supplier, however, it is not treated as a component assembly even though the component is substantially presented as a component assembly in the BOM. For example, if the above electric lamp is manufactured by using a non-finished power unit, a suspending column and a bulb, these materials are not treated as component assemblies. The substantial purpose of the BOM is to manage the design drawings/specifications and the production procedures. It is not necessary to expand these power units and suspending columns into the components as the components assemblies in the lower hierarchal layer of the BOM controlling scheme.

Now-a-day, every industrial products are requested to reduce a burden against the environment in the manufacturing and to implement a safety in the operation. For such request, the manufacturers have to disclose the hazard chemical contents or the failure rates of the products. These indicative and characteristic contents are studied and decided for each component used for the products. Therefore it is necessary to study and decide the standard values. It is normal that the suppliers submit these standard values of the components that the manufacturers have purchased from them. However, the purchasing parties need to evaluate and determine the standard values of the hazard chemical contents or the failure rates of the products if the supplier parties are not well funded or have ability for testing. In this case, it is necessary to put the component assembly in the lower hierarchal layer in the BOM.

It is the quickest method to obtain and use the BOM from the suppliers in order to put the purchased component assembly in the lower hierarchal layer. However the submitted BOMs from the suppliers are different from those of the manufactures in the design and structuring system. Therefore it is necessary to merge the BOM controlling scheme for the purpose of making matches between the submitted BOMs and the manufactures BOMs for parallel use.

The suppliers sometimes do not accept to supply BOMs to keep secrecy of the technologies. For the products that have large scale BOMs, the evaluation of the hazard chemical contents or failure rates of the products is not carried out if it is not clear, such as, which components are the components assemblies, whether the component is set in the lower hierarchal layer, or what is the reasons for the fact that the components are not set in such hierarchal positions.

In the past time, BOMs have never used for such a purpose as recording the detail technical information for the environmental issues and the safety issues. However, the reference 1 discloses an example of the system that collects the information which is available through the internet regarding the component products other suppliers supply. The system has a capability to replace the product codes with the component codes controlled in the system and to provide a new list of the components. However the list of the components is a table to include the components without a strict rule but to facilitate the selection of the relevant components used for the product design or the material procurement. Therefore the list of the components is different from a BOM that shows the members that compose the finish product. The reference 2 discloses another system that has a capability to record the unit price and the weight of the component which is put in the BOM and to compute the price and the weight of the finish product composed of the components recorded in the BOM. In such system, however, it is not necessary to put the component assembly in the lower hierarchal layers of the BOM and no description regarding such BOM structure has been given.

Reference 1:
Paragraph 0018-0043 and FIG. 1-11, Japanese Published Patent Application, 2001-265838, A (2001)

Reference 2:
Paragraph 0058-0087 and 0098-0110, FIGS. 1 and 10, Japanese Published Patent Application, 2001-331535, A (2001)

BRIEF SUMMARY OF THE INVENTION

The conventional technologies, the present invention has an advantage that even when the BOMs which suppliers submit are those compiled by different BOM controlling schemes from the reference BOMs that the purchasing parties generate by using their different BOM controlling schemes. The BOM controlling scheme regarding the present invention can merge the suppliers' BOMs to the purchasing parties' BOMs through the structural rearrangement when the component assembly is put in the lower hierarchal layer of the BOM. The present invention has further advantage that the BOM controlling scheme regarding the present invention supports a large scale BOMs where the component assemblies are appropriately expanded to the lower hierarchal layers and present the causes of failures if such expansion is not properly done.

The first advantage of the present invention is realized with the construction such that the BOM management apparatus, constructed with a computer, comprises a component identification judgment means that makes a judgment whether the components included in the BOMs of the suppliers are same as the components included the reference BOMs, a coding rule estimating means that estimates and makes a judgment whether the rule of coding the components that is included in the BOMs of the suppliers is same as the rule of coding the components that is included in the reference BOMs and a BOM rearrangement means that makes a new arrangement of the BOM data already compiled through the above means to meet the system of the reference BOM. Even if the system of the BOM of the supplier to expand the component assembly is different from the system of the reference BOM, the BOM of the supplier is conformed to meet the reference BOM and then can be merged to the reference BOM.

The second advantage of the present invention is realized in such a way that the component data in the BOM include a component assembly flag that shows the whether the component is a component assembly and a component assembly status data that shows the expansion of the component assembly to the lower hierarchal layer. The component assembly flag and the component assembly status data are concurrently presented to when the BOMs are present on the display.

By using this advantage, the person who uses the BOM of the present invention can easily get to know the status of the expansion of component assemblies or the reasons why the expansion has not been done.

As explained above, the present invention facilitates to merge the suppliers' BOMs that are complied by the different system from the reference BOMs. Since the person who uses the BOM can easily get to know the status of the expansion of component assemblies and can effectively direct the expansion of the component assemblies or the evaluation of quantity of the hazard chemical contents or the failure rates of the products.

BRIEF DESCRIPTION OF THE DRAWINGS

FIG. 2 is a schematic that shows an example of the presentation of the BOM regarding an embodiment of the present invention.

FIG. 4 is a schematic that shows an example regarding an embodiment of the present invention as for the presentation of the display of the console input and output means which is used for the purposes to operate the computer processing for the BOM management and to display the results of the computer process.

FIG. 5 is a schematic that shows an example regarding an embodiment of the present invention as for the presentation of the display of the console input and output means which is used for the purpose to operate the computer processing for the BOM management and display the results of the computer process.

FIG. 9 is a schematic that shows a content of in-process operation for BOM rearrangement after the process of the part number conformity judgment regarding an embodiment of the present invention.

FIG. 10 is a schematic that shows the presentation of the display of the console input and output means by which the results of the part number conformity judgment is provided.

FIG. 12 is a schematic that shows a content of in-process operation at the completion time of the part number renumbering process in the embodiment of the present invention.

FIG. 13 is a graphic presentation that shows the results of the part number renumbering process displayed on the console input and output means regarding the embodiment of the present invention.

FIG. 14 is a schematic that shows a content of the BOM stored in the BOM data base at the completion time of the BOM merging process in the embodiment of the present invention.

DETAILED DESCRIPTION OF THE PRESENT INVENTION

Figure 1:
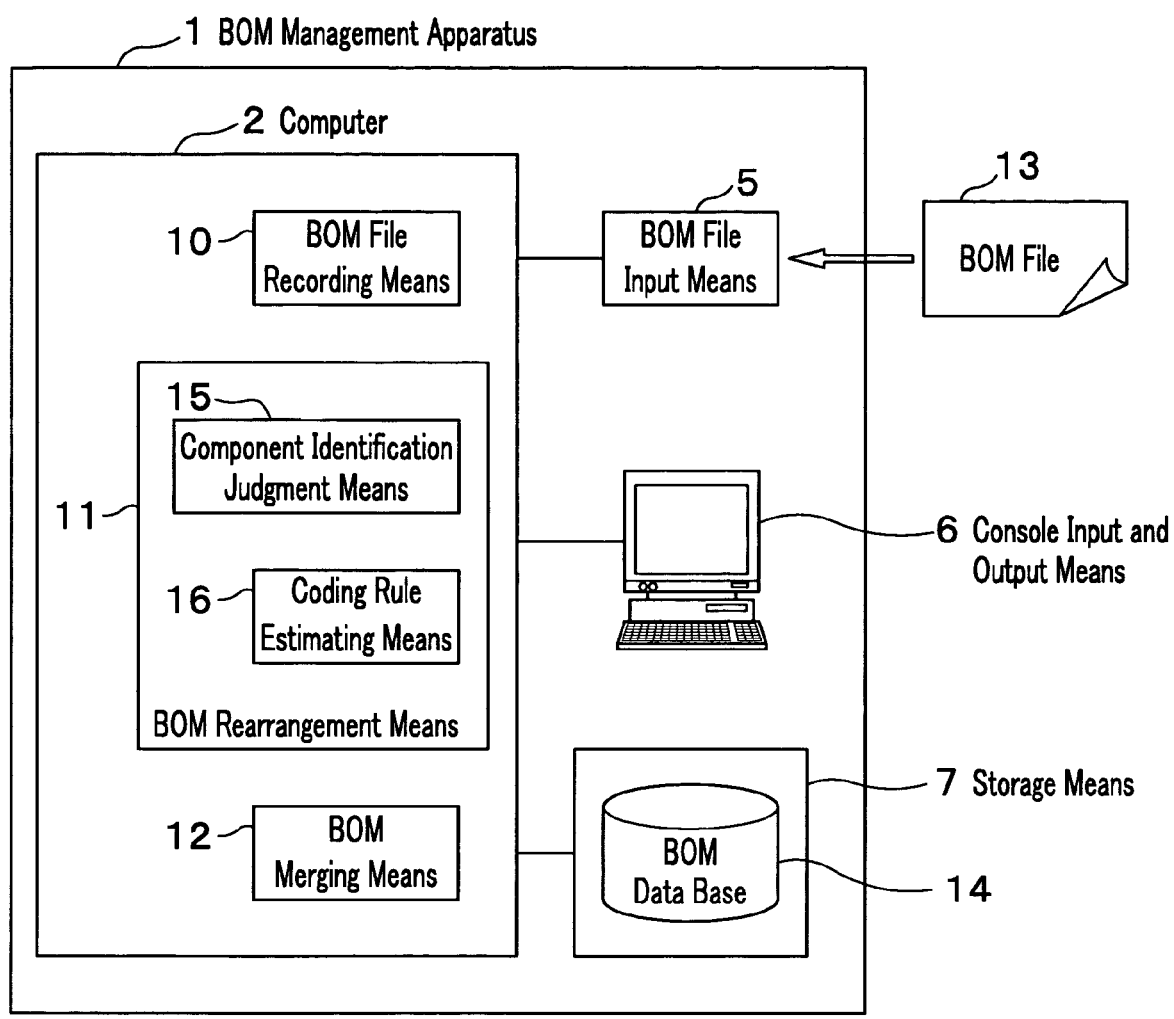
FIG. 1 is a block diagram that shows the BOM management apparatus regarding an embodiment of the present invention.

FIG. 1 shows an example of the present invention which is the block diagram of the BOM management apparatus. The BOM management apparatus 1 comprises a computer 2, a BOM file input means 5, a console input and output means 6 and a storage means 7. The computer 2 comprises a central process unit and a memory device (not shown in the figure) and functions as a BOM file recording means 10, a BOM rearrangement means 11 and BOM merging means 12. More concretely, the BOM file recording means 10 is implemented by a memory space allocated in the memory device and the BOM merging means 12 is implemented by a computer program which is stored in the memory device and carries out the function of such means by the central processor. The BOM rearrangement means 11 includes the component identification judgment means 15 and the coding rule estimating means 16.

The BOM file input means 5 may, more concretely, be various disc drive devices that handles removal media such as flexible discs, MO (Magnetic Optical) discs, DVD (Digital Versatile Disk) which store the BOM file 13 and data receiving devices which may be used for a network communication control device that receives the BOM file 13 via networks such as an LAN (Local Area Network). The console input and output means 6 is usually constructed with a keyboard, a mouse and CRT (Cathode Ray Tube) display or LCD (Liquid Crystal Display) display devices. The storage means 7 is usually constructed with hard disc storage devices which stores more than one BOM data base 14.

FIG. 2 shows an example of the present invention regarding BOM structure. As shown in FIG. 2, the BOM is constructed with a PN file 201 and a PS file 203.

The PN file 201 is a set of component record 202 which has a part number 205 and a component name as the fundamental data item. In this example, the component record 202 has further data items such as a name of a supplier 207, a supplier part number 208, price 209, a component assembly flag 210, a component assembly status 211.

The component assembly flag shows whether the component presented in the component record 202 including the component assembly is the component assembly or not. When the flag value is "True" and "False", it implies the component assembly and does not component assembly, respectively. The component assembly status 211 shows the status that the component indicated by the component record 202 including the component assembly status 211 is expanded to the lower hierarchal layers. The values indicating the expansion are "–", "expanded", "expansion impossible" and "under search" and "not found". When the component assembly flag 210 is "False", the component is not a component assembly and then the value of the component assembly status 211 becomes to be "–". On the other hand, when the value of the component assembly status 211 is "expanded", the component assembly is expanded, which implies all of the members are in the same BOM. When the value of the component assembly status 211 is "under search", "expansion impossible" or "not found", it implies that the component assembly has not been expanded into the lower members and the reasons are "under search", "expansion impossible" or "not found".

The PS file 203 is a set of the nesting record 204 that has the data items such as the mother part 212, daughter part 213 and quantity 214. The PS file 203 shows the hierarchy among the components included in the PN file. The hierarchy is presented by "a tree presentation 215". The power box A1 is composed of a chassis A11 and a drive unit A12 and the drive is further composed of an electric power unit A121, a motor A122 and a shaft A123.

The operation of an embodiment of the BOM management apparatus 1 will be explained by using FIG. 1 to 15. In the BOM data base 14, the BOM shown in FIG. 2, the PN file 201 and the PS file 203 are recorded. In other words, the name of the product which is detailed with this BOM data base 14 is a power box. The BOM stored in the BOM data base 14 may be a BOM describing a single product, a BOM including plural products or a BOM covering whole components used for the manufacturer who uses the BOM.

The PN file 201 in FIG. 2 of which component assembly flag 210 in the component record 202 having "motor" for the component name was "True" shows the component assembly status 211 is "under search" and the supplier of the member part is "B Industries". As the result, the BOM file 13 regarding the motor has been offered by "B Industries".

Figure 3:
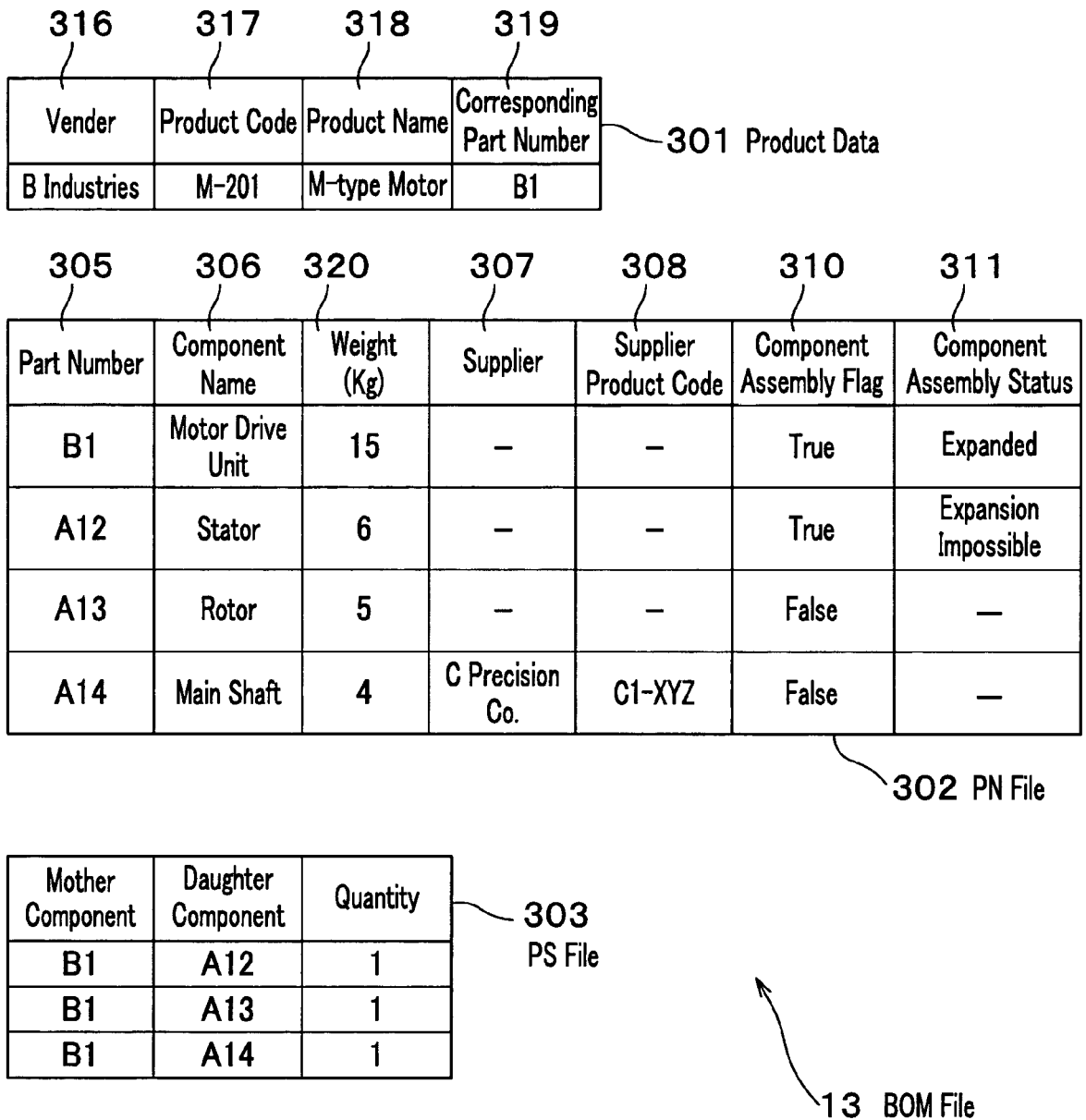
FIG. 3 is a schematic that shows an example of the presentation of the BOM which is input to the BOM management apparatus regarding an embodiment of the present invention.

FIG. 3 shows the composition of the BOM file 13 which is input to the BOM management apparatus 1 as one of the embodiments of the present invention. As shown in FIG. 3, the BOM file 13 composed of the product data 301, the PN file 302 and the PS file 303 regarding the product. The product data 301 has data items such as the vendor 316, the product code 317, the product name 318 and the corresponding part number 319. The supplier 316 implies a party from whom the product is purchased. The product code 317 is that used by the supplier. The corresponding part number 319 indicates the part number of the top component in the component structure in the PN file 302.

The systems of BOM used in own company (a purchasing party) and "B Industries". For example, the PN file 302 offered by "B Industries" has no data item of price 209 (see FIG. 2) but a data item of weight (Kg) 320. Since the part number 305 is independently coded by each of the suppliers, there is a risk that the same part number is used for different components. For the present example, the part number "A12" is used for the part number of a drive unit in the PN file 201 (see FIG. 2) and the part number of a stator in the PN file 302. When plural BOMs are merged, such non-unique use of the part numbers is excluded.

FIG. 4 shows an example of the graphic presentation 41 on the display of the console input and outout means 6 which shows the process, and the manipulation to carry out the BOM management steps in the present invention. Once the BOM management apparatus starts, the input button icon 42, the judgment button icon 43, the renumbering button icon 44 and the merging button icon 45 presented in the graphic presentation on the display of the console input and out means 6. The BOM user sets a flexible disk in the BOM input means 13 such as a flexible disk drive and clicks the input button icon 42. Then the computer 2 starts to read the BOM file 13 recorded in the flexible disk and is loaded into the memories of the computer 2 and the BOM file 13 is displayed in a window 46.

FIG. 5 shows a schematic that shows an example regarding an embodiment of the present invention as for the graphic presentation of the display of the console input and output means which is used for the purposes to operate the computer processing for the BOM management and to display the results of the computer process. The presentation shows the content of the BOM file 13. The product record 301, PN file 302 and the PS file 303 is dumped into the computer memory and they are handled as the product chart 501, the PN chart 502 and the PS chart 503. However, an annex column to accommodate the PN chart 502, an identification flag 512, a same PN 513, a coding rule flag 514 and an obsolete PN 515 is appended to the component record. The details of the members in the component record will be discussed later. These charts in the BOM file 13 are expanded in the BOM file 13 recording means 10 shown in FIG. 1.

When a BOM user clicks the judgment button icon 43 in the graphic presentation 41 shown in FIG. 4, the computer 2 starts to conform the BOM file 13 to the BOMs stored in the BOM data base 14. The major problems in the conformation are that different part numbers are assigned to an identically same component and the identically same part number is assigned to plural different components. The conformation process consists of a process to check any part number used in the BOM file 13 is used in the BOM stored in the BOM data base 14 and make a judgment for the results and a process to check any part number used in the BOM file 13 is repeatedly used in the BOM stored in the BOM data base 14 and make a judgment for the result.

Figure 6:
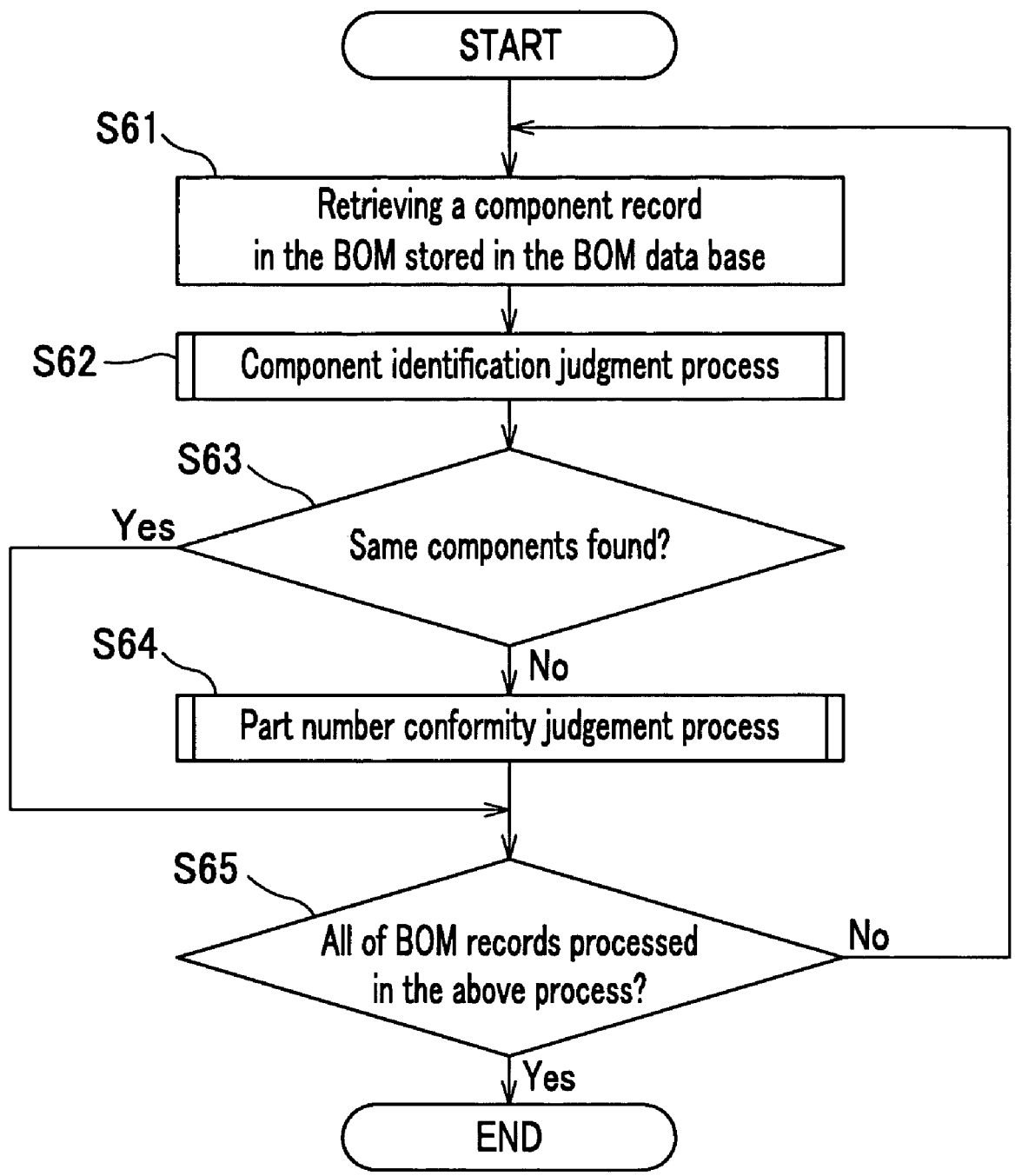
FIG. 6 is a flow chart regarding an embodiment of the present invention that shows a part number conformity judgment process in order to rearrange the BOM in the BOM file to be compliant to the BOM stored in the BOM data base.

FIG. 6 shows a flow chart of part number conformity judgment process where the BOM in the BOM file 13 is rearranged to be compliant to the BOM stored in the BOM data base 14. The computer 2 retrieves a component record in the BOM stored in the BOM data base 14 (S61). The component record has not been evaluated for checking the compliance. An identification judgment process for the components (S62) is carried out. The identification judgment process is to check whether a component described in the component record has been used in BOM in the BOM file 13. The details of this identification judgment process will be discussed with FIG. 7. When same components are not found in the identification judgment process ("No" in S63), a part number conformity judgment process (S64) is carried out. When the same components are found ("Yes" in S63), means a part number conformity judgment process (S64) is skipped. The details of the part number conformity judgment will be discussed later with FIG. 8. Next, it is checked all of BOM records have been processed in the above process (S65). If there are any BOM records which have not been checked ("No" in S65) and the process goes back to S65 and repeats the steps S61 to S65. If none of the BOM records which have not been checked ("Yes" in S65), the part number conformity judgment process is ended.

Figure 7:
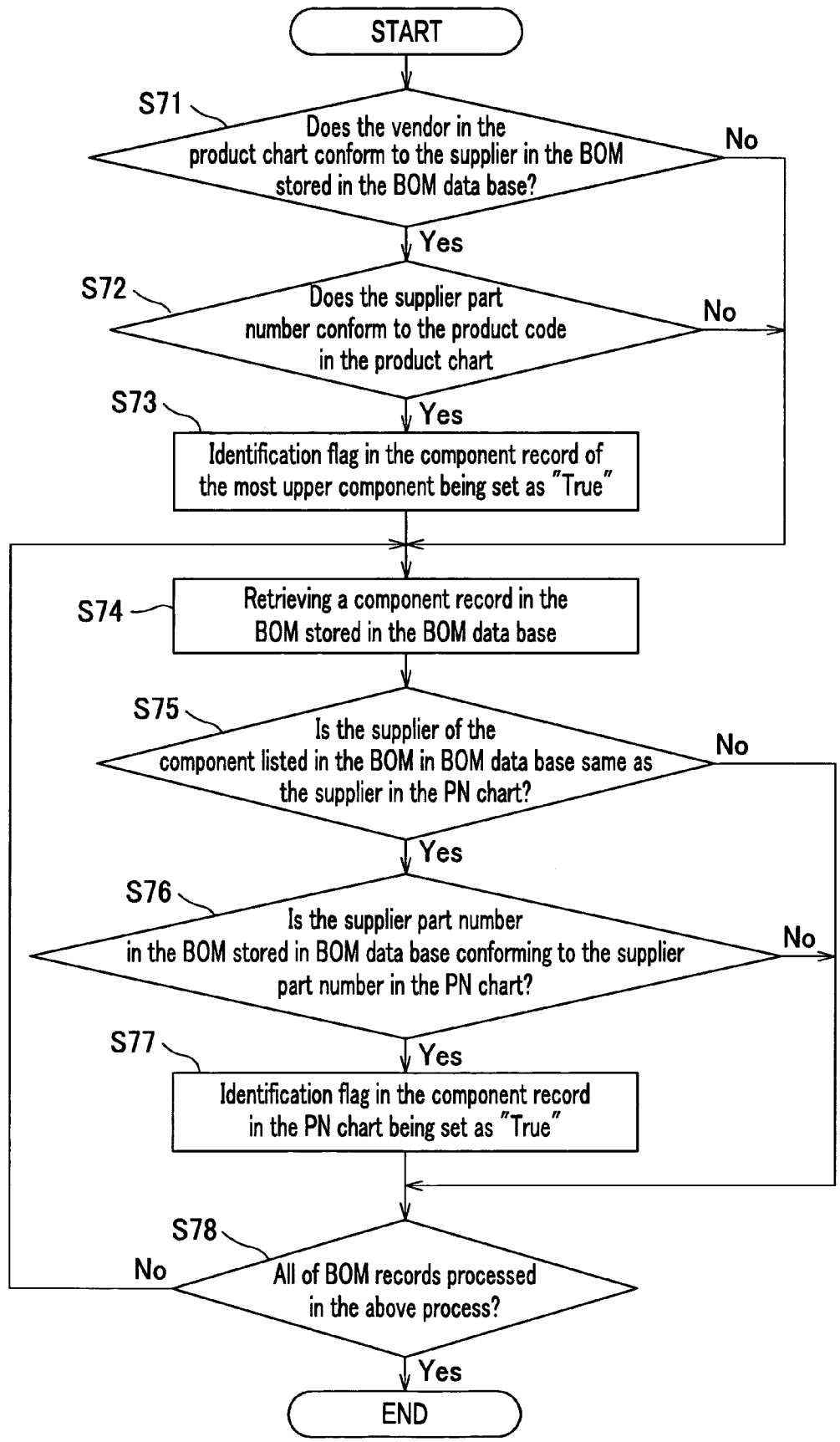
FIG. 7 is a flow chart that shows an identification judgment process included in an part number conformity judgment process regarding an embodiment of the present invention.

FIG. 7 shows identification judgment process included in the part number conformity judgment process. The component record retrieved from the BOM stored in the BOM data base 14 is compared with the product record in the BOM file 13 (which is handled as a product chart 501 in the computer memory as shown in FIG. 5). This comparison is to search the components in the BOM stored in the BOM data base 14 in order to expand the component assembly into the lower hierarchal layers. This identification judgment process is carried out by the component identification judgment means 15 as shown in FIG. 1.

First of all, the supplier 207 in the BOM stored in the BOM data base 14 is compared with the vendor 501 in the product chart. If they are conforming ("Yes" in S71), then the supplier part number 208 is compared with the product code 517 in the product chart 501 (S72). When the supplier part number 208 and the product code 517 are conforming ("Yes" in S72), the identification flag in the component record of the most upper component is set as "True" so that the flag value is "True" (S73). This implies that the component is included in the BOM stored in the BOM data base 14. The part number in the component record in the BOM stored in the BOM data base 14 is set in a column of a temporary part number 513 for conforming component in the step S73. If the results of the comparison indicate non-conforming ("No" in S71 and "No" in S72) each other, the step proceeds to the step S74 with skipping over the step S73.

The component record retrieved from the BOM stored in the BOM data base 14 is compared with the component record in the PN file (which is handled as a PN chart 502 in the computer memory as shown in FIG. 5). The comparison is for the process to check the components which compose a component assembly are included in the BOM stored in the BOM data base 14. A component record which has not been checked yet is retrieved from the PN file (which is handled in the computer memory as shown in FIG. 5) in the BOM file 13 (S74). The supplier 207 of the component listed in the BOM in BOM data base 14 and the supplier 507 in the PN chart 502 are compared. If they are conforming ("Yes" in S75), the supplier part number 208 in the BOM stored in BOM data base 14 is compared with the supplier part number 508 in the PN chart 502 (S76). When they are conforming ("Yes" in S76), the identification flag in the component record in the PN chart 502 is set as "True" so that the flag value is "True" (S77). In the step S77, the part number 205 in the component record in the BOM stored in the BOM data base 14 is set in a column of a temporary part number 513 for conforming component in the step S73. If the results of the comparison indicates non-conforming ("No" in S75 and "No" in S76) each other, the step proceeds to the step S78 with skipping over the step S77. In the step S78, it is checked whether all component records in the BOM stored in the BOM data base 14. If there are any BOM records which have not been checked ("No" in S78) and the process goes back to S74 and repeats the steps the part number conformity judgment process. If all of the part number conformity judgment process are completed ("Yes" in S78), the identification judgment process is ended.

In the above process, the judgment for the identification is based on the conforming between the supplier and supplier part number, however, it may be judged for the identification regarding the manufacturing term, the lot number in addition to the supplier and the supplier part number as similar to FIG. 7.

Figure 8:
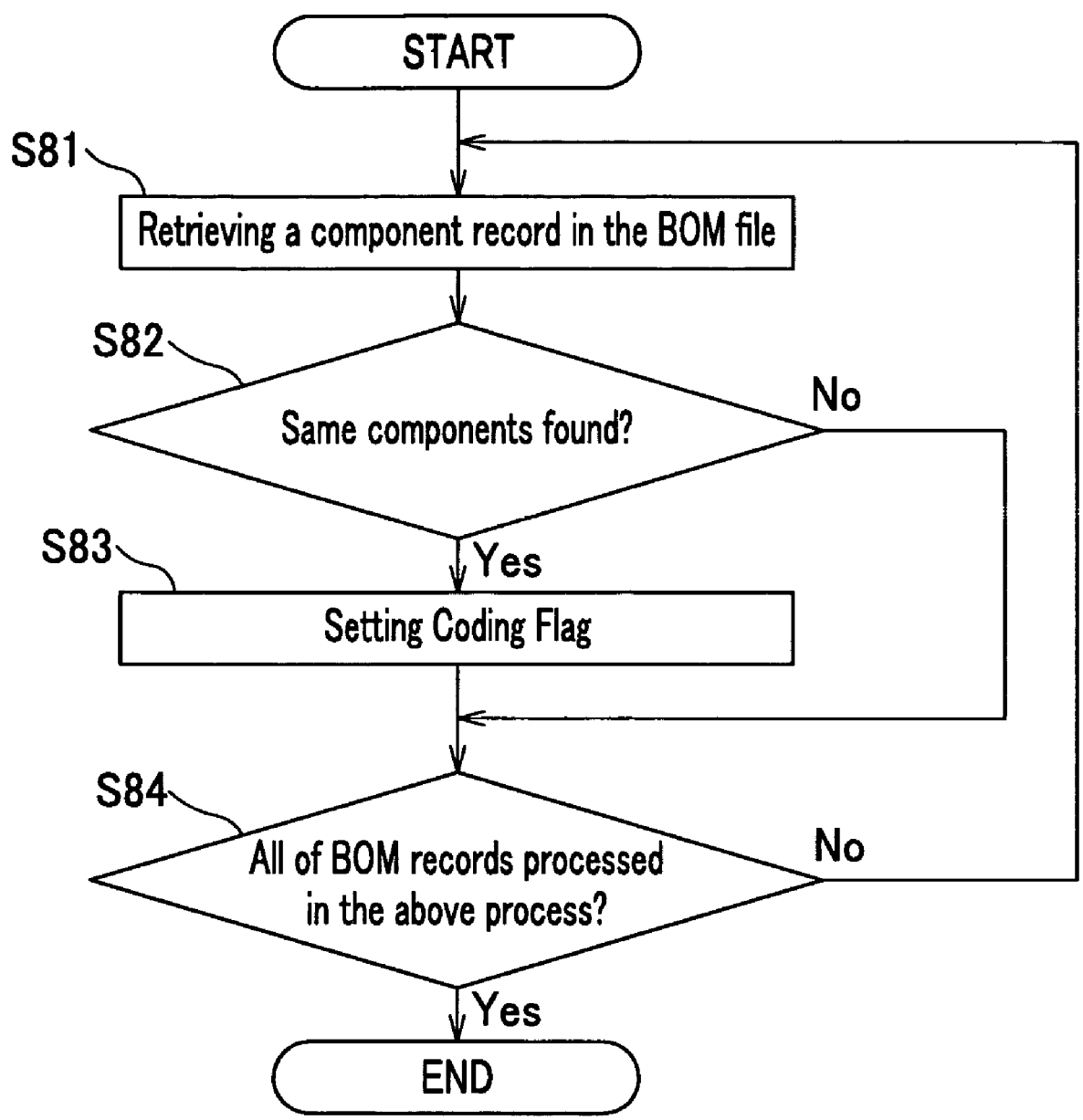
FIG. 8 is a flow chart of a part number conformity judgment included in part number conformity judgment process which is an embodiment of the present invention.

FIG. 8 shows a flow chart of a coding rule estimating process included in a part number conformity judgment which is an embodiment of the present invention. The coding compliance is a compliance between the coding of the part numbers and/or component numbers of the BOMs complied by different BOM controlling schemes. A coding rule estimating process estimates a coding rule of the components listed in a BOM which is recorded in the BOM file 13 and determines a possibility to arrange the BOM in compliance with the BOM controlling scheme which compiles the BOM stored in the BOM data base 14. There are various coding rules. The simplest rule but the minimum requisite rule for the coding, such as a unique coding scheme where the part number assigned to a specific component is never used for different components. Therefore, the different part numbers are assigned to the different components. The coding rule estimation is done with respect to the coding in such an aspect that the part numbers of the components used in the BOM file 13 are checked whether they have already been used for the part numbers of the BOM stored in the BOM data base 14. The coding rule estimating means provided in the present embodiments and prescribed in the appended claims carries out and implies this coding rule estimating process, respectively.

FIG. 9 shows a schematic that shows a content of in-process operation for BOM rearrangement after the process of the part number conformity judgment regarding an embodiment of the present invention. FIG. 10 shows the presentation of the display of the console input and output means by which the results of the part number conformity judgment is provided. As shown in FIG. 9, an identification flag 512 and a same PN 513 are given in the identification judgment process and the coding rule flag 514 is set in the a part number conformity judgment. The result of the part number conformity judgment is presented in a judgment result window 1001 as shown in FIG. 10. The part number 505, and the identification flag 512, the same PN 513 and the coding rule flag 514 are only shown in FIG. 10. However, the other items regarding the judgment and/or all or a part of the PN chart 502 or the product chart 503 may be shown in the judgment results window 1001.

The user clicks the renumbering button icon 44 on the graphic presentation 41 shown in FIG. 10, the computer 2 carries out a part number renumbering process.

Figure 11:
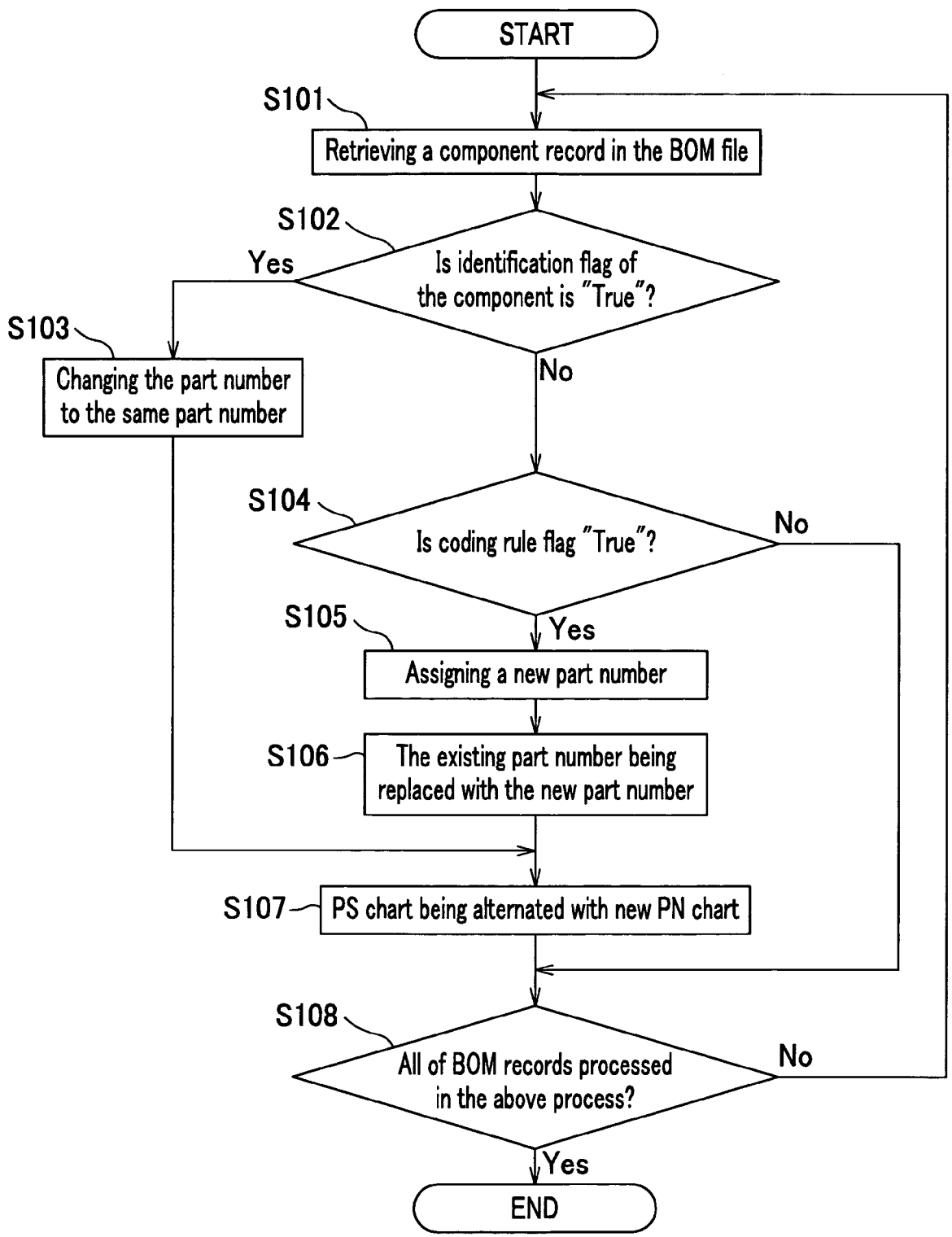
FIG. 11 is a flow chart that shows the part number renumbering process, by which the BOM file is rearranged to be merged to the BOM stored in the BOM data base regarding the embodiment of the present invention.

FIG. 11 shows a flow chart of the part number renumbering process, by which the BOM file 13 is rearranged to be merged to the BOM stored in the BOM data base 14 through the structural rearrangement. One component record in the PN file (which is handled as a PN chart 502 in the computer memory as shown in FIG. 9), which has not been previously selected yet, is selected (S101). If the identification flag 512 of the component is "True" ("Yes" in S102), the content of the part number 505 is moved to the obsolete part number 515 and the part number 505 is alternated by the same PN 513 (S103). The part number in the PS chart is alternated with the same PN 513 as well (S107).

If the identification flag 512 in the component record is not "True" ("No" in S102), then the coding rule flag 514 in the component record is checked in a judgment step (S104). If the coding rule flag 514 is "True" ("Yes" in S104), a new part number is assigned to the component described in the component record (S105). The new part number may be determined in compliance to the predetermined coding rule, however it cannot be duplicated with the existing part numbers used for the components listed in the BOM stored in the BOM data base 14 at worst. When the new part number is assigned, the existing part number 505 of the component record is replaced with the new part number (S106). The new part number after such replacement replaces the part number in the PS chart 503. In the judgment of the step S104, the step proceeds to the step S108 if the coding rule flag 514 is not "True" ("Yes" in S104).

In the step S108, judgment is done to check whether all of the components listed in the PN file (which is handled as a PN chart 502 in the computer memory as shown in FIG. 9) in the BOM file 13 have been completed through this part number renumbering process. If any component records which have not been processed are found ("No" in S108), the step goes back to the step S101 and the actual steps for the part number renumbering process are repeated. If all of component records have been processed ("Yes" in S108), the part number renumbering process is ended.

This part number renumbering process is carried out by the BOM rearrangement means 11 shown in FIG. 1 as well as an identification judgment process and the coding rule estimating process.

FIG. 12 shows a schematic that shows a content of in-process operation at the completion time of the part number renumbering process in the embodiment of the present invention. FIG. 13 shows the graphic presentation 41 of displayed on the console input and output means 6, which presents the results of the part number renumbering process. By comparing FIG. 12 with FIG. 9, it can be seen that the part number 505 in the PN chart 502 has been renumbered and that the corresponding part number in the PS chart 503 is altered. The results of the part number renumbering process is given in the renumbering result window 1301 displayed on the graphic presentation 41. In this window, the part number 505, the coding rule flag 514 and the obsolete part number 515 are only presented. However, the other items obtained in the renumbering process may be presented. All of the records in the PN chart 502 and PS chart 503 may be presented.

When the user clicks the merging icon 45 on the graphic presentation 41 in FIG. 13, the computer 2 starts to carry out a BOM merging process, where a component record of which identification flag is not "True" in the PN chart 502 of the BOM file 13 which has already processed in the part number renumbering process is retrieved and the record items of the component record are rearranged to be compliant to those of the BOM stored in the BOM data base 14 and the component record is appended to the PN file 201 in the BOM stored in the BOM data base 14. The nesting component record in the PS chart 503 of the BOM file 13 is added to the PS file 203 of the BOM stored in the BOM data base 14. If the identification flag 512 in the component record is "True" in the PN chart in the BOM file 13, the content of component assembly status 511 of the component assembly included in the component record replace the content in the component assembly status 211 of the corresponding component assembly in the PN file 201 in the BOM stored in the BOM data base 14.

This BOM merging process is carried out by the BOM merging means 12 shown in FIG. 1.

Figure 15:
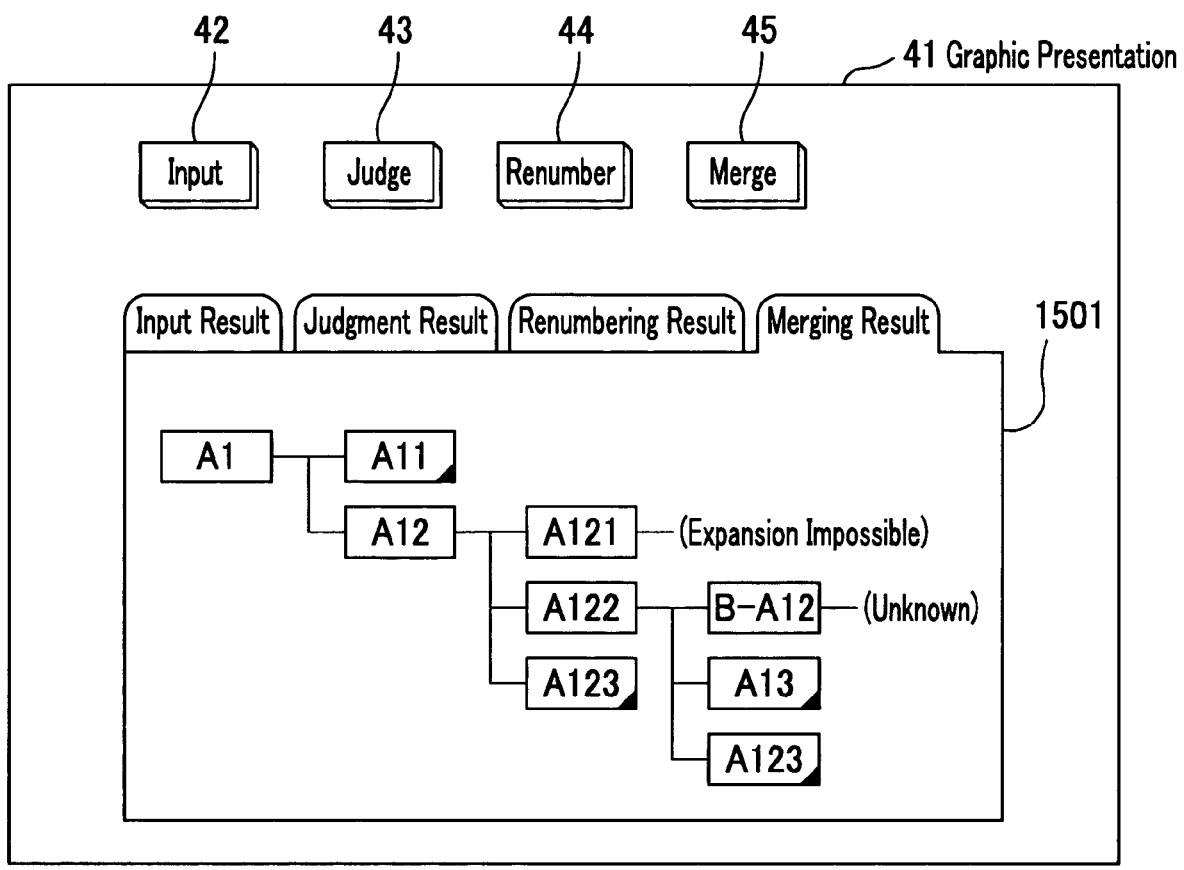
FIG. 15 is a schematic that shows the graphic presentation of the results of the BOM merging process displayed on the console input and output means regarding the embodiment of the present invention.

FIG. 14 shows a schematic that shows a content of the BOM stored in the BOM data base 14 at the completion time of the BOM merging process in the embodiment of the present invention. FIG. 15 shows the graphic presentation 41 of displayed on the console input and output means 6, which presents the results of the BOM merging process. By comparing FIG. 14 with FIG. 2, it can be seen that a motor which is a component assembly has been expanded to a stator and a rotor. The part number assigned to the stator included in the supplier BOM has been renumbered since the part number had been already used for the part number of the existing drive unit. The shaft has already been used for the component composing the drive unit and the shaft is not added to the PN file 141 as duplication.

The BOM stored in the BOM data base 14 after completion of the BOM merging process is presented in a tree structure form of the hierarchal layers of the components in the merging result window 1501 displayed on the graphic presentation 41. The dark marks at the corners of the boxes enclosing the part numbers implies that they are not the component assembly and they are not necessary to be expanded to the lower hierarchal layers. The component assembly which is composed of the components that are further expanded to the lower hierarchal layers has, for example, a component assembly status, that says "A121 component cannot be expanded to the lower layers by the reason of expansion impossible". According to the presentation of the component assembly status, the user can easily understand which component assembly is to be expanded to the lower hierarchal layers and the reason why the expansion is not possible. The presentation of the BOM stored in the BOM data base 14 after completion of the BOM merging process is not necessary provided in a tree structure form but may be provided in a presentation such that the parts or all of the PN file 1401 and the PS file 1402 are in a form of charts.

As explained in FIG. 3-15, the data processing by the computer 2 can merge the BOM file 13 of which controlling scheme is different from the controlling scheme used for the BOM data base 14 into the BOM data base 14. The display presentation of the merged BOM shows the status of the expansion of the component assembly to the lower hierarchal layers. The user can easily understand the status of the expansion.

The addition of the items regarding hazard chemical contents or the failure rates of the products is easily carried out after completion of the merging as previously explained First Variation of Embodiment In the explanation of the previous embodiment, a concrete coding rule such that the same part number is never coded as a part number for the other part numbers is adopted. The present variation of the embodiment uses another coding rule such that the part number to be allocated for the newly added BOM is a serial part number to follow the latest part number of the lately added components. In other words, a new serial number starting from the last part number is allocated to every new component to be recorded in the BOM data base 14.

The coding rule of the BOM file 13 always keeps no correspondence to the coding rule of the BOM stored in the BOM data base 14. Therefore it is not necessary to make judgment whether the part number allocated to the components put in the BOM file 13 is already used for the BOM stored in the BOM data base 14. The coding rule flag 514 is not necessary and no actual process as a coding rule estimating process is carried out so that the process is regarded as a dummy process. The judgment process of the step S104 is not necessary in the part number renumbering process (which corresponds to FIG. 11) and the new serial number coding in the step S105 may be performed by starting the renumbering from the latest allocated part numbers.

Second Variation of Embodiment

The operation of the merging process, such that the BOM file data 13 is merged to the BOM stored the BOM data base 14, is carried out by clicking the input icon 42, the judgment icon 43, the renumbering icon 44 and the merging icon 45 in an order as shown in FIG. 4, FIG. 10, FIG. 13 and FIG. 15. However, the operation of the merging process is not necessary to be confined by this sequential process.

In the present variation of the embodiment, once clicking a subsequent icon before the previous process has not been started, the previous process is processed without clicking the previous process and the processes up to the process designated by clicking the icon is carried out. For example, the four icons shown in the display 4 in FIG. 4 are presented and not selected, but once the renumbering icon 44 is clicked then the input process, all of the part number conformity judgment process and the part number renumbering process are sequentially executed at once. The merging icon is further clicked, the merging operation such that the BOM data is merged to the BOM data base 14. By implementing this human interface in the system for the BOM management apparatus 1, it is possible to reduce work load burdened to the operator and improve the work efficiency.

As another implementation, it is possible to remove all of these icons. The computer 2 is once notified that the BOM file 13 is set in the BOM file input means 5 and then the computer 2 carries out all of the input process, the part number conformity judgment process and the part number renumbering process are sequentially executed at once. By this process, an automated merging process of the BOM file 13 is possible. In this example, the BOM file 13 is given by files stored in the recoding media to be installed in the input and output device locally allocated to the BOM management system 1. But they can be the files to be installed in another computer 2 if the files are to be transferred through the internet.

The presentation window which shows the results of the plural processes on the display 41 as shown in FIG. 10, FIG. 13 and FIG. 15 provides tabs by which any of the results of the plural processes are selected to the front presentation. Each presentation is independently adjusted of the sizes. Therefore the operator can check the past process results and review the data by making comparison among these process results.

Variation 3 of Embodiment

In the previous embodiment, the merging process to merge to the BOM data base 14 is carried out every time when such that the input BOM file 13 is set in the BOM file input means 5. However, the present example, each of the plural BOM files 13 is managed as an independent file and is merged to the BOM stored the BOM data base 14. This BOM management method is convenient when an original product is expanded into series products with variation of specifications with modifications made in the part of the original product. For example, BOM management method, such that a common BOM stored in BOM data base 14 is created for common components and other BOMs are created for the components used for the variation parts of the modifications made in the series products, may be adopted. The BOMs for components used for the variation parts are merged to the common BOM stored in the BOM data base if necessary.

For this variation of the embodiment, the following three points need to be changed even the previous embodiments can be exploited as they are.

The first point is that the plural BOM files 13 are to be managed as the BOM data files (not shown in the figures). For this purpose, the BOM data files are stored in the hard disk installed to the computer 2. In addition, the BOM data files may be those installed in another computer system which is connect to the computer 2 through an internet.

The second point is that necessary files are to be selected from the plural BOM data files and are to be merged to another BOM as a BOM file 13. For this purpose, a human interface such as graphical display etc. by which the user of the BOMs selects necessary files and starts merging of the BOMs. Examples for such displays and process flows are not shown.

The third point is that the BOM stored in the BOM data base 14 is duplicated when the BOM merging process has started to merge BOMs, which is a duplication in the BOM data base 14, replaces the BOM stored in the BOM data base 14 upon the access and the process is ended. By this method, the BOM stored in BOM data base 14 can be repeatedly used as a versatile BOM that has records of the common components.

As explained above, the present variation of the embodiment features that variation products of series products do not need to have a complete BOM each by each, which results in the reduction of the amount of BOM data base 14.

Variation 4 of Embodiment

The above embodiment can be applied for the case that the BOM stored in the BOM data base of X corporation to the BOM stored in the BOM data base of Y corporation are merged and the BOM stored in the BOM data base of Z corporation. For this case a new BOM stored in the BOM data base of Z corporation is created based on BOMs stored in the BOM data bases of X corporation and Y corporation. There are two methods to merge the BOM stored in the BOM data base.

For the first case, the BOM stored in the BOM data base of X corporation is treated as the BOM file 13 and the BOM stored in the BOM data base of Y corporation is treated as a BOM stored in the BOM data base. Then it is possible to merge the BOM stored in the BOM data base of X corporation to the BOM stored in the BOM data base of Y corporation. Therefore coding rule of BOM is rectified by that of the coding rule of the BOM stored in the BOM data base of Y corporation.

For the second case, a new vacant BOM stored in the BOM data base of Z corporation, having a new coding rule, is created and handled as the BOM stored in the BOM data base. The BOM BOMs stored in the data bases of both X corporation and Y corporation are treated as the BOM files 13 and the merging operation previously described is performed. Then the BOM stored in the BOM data bases of X corporation and Y corporation are evenly merged into the BOM stored in the BOM data base of Z corporation so that a new coding rule is applied to the components listed in both BOMs stored in the BOM data bases.

Variation 5 of Embodiment

For case that X corporation and Y corporation cooperate or the both parties keep independency after merging, the variation 3 of the embodiment is applied. The BOMs stored in the BOM data bases of both parties are independently managed and merged on necessity. Of course there are two kind of merging.

In the first case, the BOM stored in the BOM data base of X corporation is treated as a BOM file 13 to which the BOM stored in the BOM data base of X corporation is input and the BOM stored in the BOM data base of Y corporation is treated as BOM stored in the BOM data base 14. The BOM stored in the database of BOM of Y corporation is duplicated. The BOM stored in the BOM database of X corporation is merged to the BOM stored in the BOM data base of Y corporation. Therefore the coding rule of the BOM stored in the BOM data base is rectified by and merged to that of Y corporation. After the merged BOM stored in the BOM data base is completely used, the duplicated BOM stored in the BOM data base of Y corporation is returned to the original BOM stored in the BOM of Y corporation.

In the second case, a new vacant BOM, having a new coding rule, is created and handled as the BOM stored in the BOM data base 14. The BOMs stored in the BOM data bases of both X corporation and Y corporation are treated as the BOM files 13 and the merging operation previously described is performed. Then the BOMs stored in the BOM data bases of X corporation and Y corporation are evenly merged into the BOM stored in the BOM data base which has a new coding rule.

What is claimed is:

1. A management apparatus for controlling data of bill of material (abbreviated as BOM, hereinafter), which manages plural sets of BOMs compiled by different BOM controlling schemes, comprising:
    a BOM scheme retrieval means that is to retrieve a BOM controlling scheme to be used as a reference BOM controlling scheme from a memory means,
    a BOM input means that inputs a BOM file to the management apparatus, the BOM file having a different BOM controlling scheme than the reference BOM controlling scheme,
    a BOM rearrangement means that rearranges the BOM filed in the BOM file having the different BOM controlling scheme to meet a BOM compiled by the reference BOM controlling scheme,
wherein if a part number assigned a component in the input BOM file is different from a part number assigned to the same component of the BOM in the reference BOM controlling scheme, the part number of the input BOM file is renumbered to match the part number of the BOM in the reference BOM controlling scheme.

2. A management apparatus for controlling data of bill of material (abbreviated as BOM, hereinafter), comprising:
    a computer including at least a processor and a memory, and a storage means, being built-in or linked to the computer, that stores a BOM data base which holds BOMs in a data base management scheme therein;
    a BOM file input means that inputs a BOM file, in which BOMs compiled by a different BOM controlling scheme are filed, to the computer,
    and a console input and output means that presents the BOM and commands to compile the BOM, wherein
    the computer includes BOM file recording means to record a BOM file input through the BOM file input means or in-process data, a BOM rearrangement means that rearranges the BOM recorded in the BOM file recording means to meet the BOM, being compiled by a BOM controlling scheme which is used for the management apparatus, which is stored in BOM data base and a BOM merging means that merges a BOM processed by the BOM rearrangement means with a BOM stored in the BOM data base and then records a merged BOM stored in the BOM data base in the storage means,
    wherein the BOM file input to the computer has a BOM controlling scheme different from the BOM controlling scheme of the BOM stored in the BOM data base,
    wherein if a part number assigned a component in the input BOM file is different from a part number assigned to the same component of the BOM in the reference BOM controlling scheme, the part number of the input BOM file is renumbered to match the part number of the BOM in the reference BOM controlling scheme.

3. A management apparatus according to claim 2, wherein the BOM rearrangement means includes a component identification judgment means that makes an identification judgment between components described in a component record listed in a BOM recorded in the BOM file recording means and components described in a component record listed in the BOM stored in the BOM data base, and
    a coding rule estimating means that estimates a coding rule of the components listed in a BOM which is recorded in the BOM file recording means and determines that the part number assigned to the component is not used for a different component such that the BOM is in compliance with the BOM controlling scheme which compiles the BOM stored in the BOM data base.

4. A management apparatus according to claim 2 or claim 3, wherein
    both the BOM recorded in the BOM file recording means and the BOM stored in the BOM data base include a component assembly flag indicating whether a component specified by the component record is a component assembly, and a component assembly status descriptor indicating whether the component assembly is further expanded in lower hierarchal layers, both of which flag and status descriptor are handled by the computer and edited by the console input and output means therein.

5. A management program for controlling data of bill of material (abbreviated as BOM, hereinafter) characterized by plural functions, configured in a computer including at least a processor and a memory, and a storage means, being built-in or linked to the computer, that stores a BOM data base which holds BOMs in a data base management scheme therein has the functions of:
    a BOM file input means that inputs a BOM file, in which BOMs compiled by a different BOM controlling scheme are filed, to the computer,
    and a console input and output means that presents the BOM and commands to compile the BOM, wherein
    the computer includes BOM file recording means to record a BOM file input through the BOM file input means or in-process data, a BOM rearrangement means that rearranges the BOM recorded in the BOM file recording means to meet the BOM, being compiled by a BOM controlling scheme which is used for the management apparatus, which is stored in BOM data base and a BOM merging means that merges a BOM processed by the BOM rearrangement means with a BOM stored in the BOM data base and then records a merged BOM stored in the BOM data base in the storage means,
    wherein the BOM file input to the computer has a BOM controlling scheme different from the BOM controlling scheme of the BOM stored in the BOM data base,
    wherein if a part number assigned a component in the input BOM file is different from a part number assigned to the same component of the BOM in the BOM controlling scheme, the part number of the input BOM file is renumbered to match the part number of the BOM in the BOM controlling scheme.

6. A management program according to claim 5 further having functions therein comprising;
    the BOM rearrangement means includes a component identification judgment means that makes an identification judgment between components described in a component record listed in a BOM recorded in the BOM file recording means and components described in a component record listed in the BOM stored in the BOM data base, and
    a coding rule estimating means that estimates a coding rule of the components listed in a BOM which is recorded in the BOM file recording means and determines that the part number assigned to the component is not used for a different component such that the BOM is in compliance with the BOM controlling scheme which compiles the BOM stored in the BOM data base.

7. A management program according to claim 5 or claim 6 further having functions therein comprising;
    the both the BOM recorded in the BOM file recording means and the BOM stored in the BOM data base include a component assembly flag indicating whether a component specified by the component record is a component assembly, and a component assembly status descriptor indicating whether the component assembly is further expanded in lower hierarchal layers, both of which flag and status descriptor are handled by the computer and edited by the console input and output means therein.

8. A management method for controlling data of bill of material (abbreviated as BOM, hereinafter) characterized by the plural steps, configured in a computer including at least a processor and a memory, and a storage means, being built-in or linked to the computer, that stores a BOM data base which holds BOMs in a data base management scheme therein has the steps of:

inputting a BOM file, in which BOMs complied by a different BOM controlling scheme are filed, to the computer, presenting a BOM and commands to compile the BOM, wherein the computer records the inputted BOM file, rearranging the BOM recorded to meet the BOM, being compiled by a BOM controlling scheme which is used for the management apparatus, which is stored in a BOM data base and merging a rearranged BOM with a BOM stored in the BOM data base and then recording a merged BOM stored in the BOM data base in the storage means, wherein the BOM file inputted to the computer has a BOM controlling scheme different from the BOM controlling scheme of the BOM stored in the BOM data base, wherein if a part number assigned a component in the input BOM file is different from a part number assigned to the same component of a BOM in the BOM controlling scheme, the part number of the input BOM file is renumbered to match the part number of the BOM in the BOM controlling scheme.

9. A management method according to claim 8 further comprising the steps of;

the rearrangement step includes an identification judgment between components described in a component record listed in a recorded BOM and components described in a component record listed in the BOM stored in the BOM data base, and estimating a coding rule of components listed in a recorded BOM and determining that the part number assigned to the component is not used for a different component such that the BOM is in compliance with the BOM controlling scheme which compiles the BOM stored in the BOM data base.

10. A management method according to claim 8 further comprising the steps of;

both the recorded BOM and the BOM stored in the BOM data base include a component assembly flag indicating whether a component specified by the component record is a component assembly, and a component assembly status descriptor indicating whether the component assembly is further expanded in lower hierarchal layers, both of which flag and status descriptor are handled by the computer and edited by the console input and output means therein.

11. A management method according to claim 9 further comprising the steps of;

both the recorded BOM and the BOM stored in the BOM data base include a component assembly flag indicating whether a component specified by the component record is a component assembly, and a component assembly status descriptor indicating whether the component assembly is further expanded in lower hierarchal layers, both of which flag and status descriptor are handled by the computer and edited.

* * * * *

UNITED STATES PATENT AND TRADEMARK OFFICE
CERTIFICATE OF CORRECTION

PATENT NO. : 7,610,259 B2  
APPLICATION NO. : 11/017038  
DATED : October 27, 2009  
INVENTOR(S) : Yuda et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Signed and Sealed this

Twelfth Day of October, 2010

David J. Kappos  
*Director of the United States Patent and Trademark Office*